United States Patent
Yin

(10) Patent No.: US 10,978,109 B2
(45) Date of Patent: Apr. 13, 2021

(54) SYNCHRONOUSLY PLAYING METHOD AND DEVICE OF MEDIA FILE, AND STORAGE MEDIUM

(71) Applicant: Beijing Bytedance Network Technology Co., Ltd., Beijing (CN)

(72) Inventor: Guohui Yin, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/002,067

(22) Filed: Aug. 25, 2020

(65) Prior Publication Data

US 2020/0388304 A1    Dec. 10, 2020

Related U.S. Application Data

(63) Continuation of application No. PCT/CN2018/103474, filed on Aug. 31, 2018.

(30) Foreign Application Priority Data

May 29, 2018   (CN) .......................... 201810571720.1

(51) Int. Cl.
    *H04N 5/93*   (2006.01)
    *G11B 27/10*   (2006.01)
    *H04N 5/04*   (2006.01)

(52) U.S. Cl.
    CPC .............. *G11B 27/10* (2013.01); *H04N 5/04* (2013.01); *H04N 5/9305* (2013.01)

(58) Field of Classification Search
    CPC ........ G11B 27/10; H04N 5/9305; H04N 5/04; H04N 21/4307; H04N 21/44004;
(Continued)

(56) References Cited

U.S. PATENT DOCUMENTS 7,362,702 B2    4/2008   Terrell et al.
2011/0320777 A1   12/2011   Nemiroff et al.
(Continued)

FOREIGN PATENT DOCUMENTS

CN    102055717 A    5/2011
CN    102497423 A    6/2012
(Continued)

OTHER PUBLICATIONS

International Patent Application No. PCT/CN2018/103474; Int'l Search Report; dated Jan. 30, 2019; 2 pages.
(Continued)

*Primary Examiner* — Robert Chevalier
(74) *Attorney, Agent, or Firm* — BakerHostetler

(57) ABSTRACT

The disclosure relates to a synchronously playing method and device of a media file, and a storage medium, the method includes: creating a media source object corresponding to a playing window in a webpage through a player embedded into the webpage; adding different tracks in the fragmented media file into the same source buffer object in the media source object; transmitting a virtual address taking the media source object as a data source to a media element of the webpage; calling the media element to parse the media source object associated with the virtual address, and reading the tracks in the source buffer object of the associated media source object, and decoding and playing the tracks.

20 Claims, 7 Drawing Sheets

(58) Field of Classification Search
CPC ..... H04N 21/44008; H04N 21/440218; H04N 21/8456
USPC ................ 386/244, 353, 355, 356, 343, 378
See application file for complete search history.

(56) References Cited

U.S. PATENT DOCUMENTS

| | | |
|---|---|---|
| 2014/0297882 A1 | 10/2014 | Estrop et al. |
| 2014/0337120 A1* | 11/2014 | Ercanbrack ........ G06Q 30/0244 705/14.43 |
| 2016/0342384 A1 | 11/2016 | Lee et al. |
| 2017/0024097 A1* | 1/2017 | Lu ..................... G06Q 30/0241 |

FOREIGN PATENT DOCUMENTS

| | | |
|---|---|---|
| CN | 103051953 A | 4/2013 |
| CN | 104133898 A | 11/2014 |
| CN | 104575547 A | 4/2015 |
| CN | 105393544 A | 3/2016 |
| CN | 106063282 A | 10/2016 |
| CN | 107197387 A | 9/2017 |
| CN | 107888932 A | 4/2018 |
| KR | 2012-0058015 A | 6/2012 |

OTHER PUBLICATIONS

"Building a simple MPEG-DASH streaming player"; https://docs.microsoft.com/en-us/previous-versions/windows/internet-explorer/ie-developer/samples/dn551368(v=vs.85)?redirectedfrom=MSDN; Microsoft; Mar. 3, 2016; accessed Dec. 17, 2020; 23 pages.

\* cited by examiner

SYNCHRONOUSLY PLAYING METHOD AND DEVICE OF MEDIA FILE, AND STORAGE MEDIUM

CROSS-REFERENCE TO RELATED DISCLOSURES

This disclosure is a continuation of PCT application Ser. No. PCT/CN2018/103474, filed Aug. 31, 2018, which claims the benefit of priority to Chinese Patent with the disclosure number 201810571720.1, filed May 29, 2018. The entire content of this disclosure is hereby incorporated by reference herein.

TECHNICAL FIELD

The disclosure relates to a multimedia technology, and more particularly to a synchronously playing method and device of a media file, and a storage medium.

BACKGROUND ART

The Moving Picture Experts Group (MPEG)-4 format is a widely used box format that can store video data and audio data in a variety of encoding modes.

A player embedded in a browser plays contents by using media elements of a Hyper Text Markup Language (HTML) 5 of the browser. The player plays a media file through a webpage of the browser or a webpage of an application (APP) embedded into a browser kernel. However, the related technology is inadequate for supporting the playing of the media file, so a problem that videos and audios are asynchronous occurs in the play process.

SUMMARY

In view of this, an embodiment of the disclosure provides a synchronously playing method and device of a media file, and a storage medium, which can ensure video and audio synchronization when playing a media file in a webpage.

An embodiment of the disclosure provides a synchronously playing method of a media file, comprising: creating a media source object corresponding to a playing window in a webpage through a player embedded into the webpage; adding different tracks in the fragmented media file into the same source buffer object in the media source object; transmitting a virtual address taking the media source object as a data source to a media element of the webpage; calling the media element to parse the media source object associated with the virtual address, reading the tracks in the source buffer object of the associated media source object, and decoding and playing the tracks.

An embodiment of the disclosure provides a synchronously playing device of a media file, comprising: at least one processor; and at least one memory communicatively coupled to the at least one processor and storing instructions that upon execution by the at least one processor cause the device to: create a media source object corresponding to a playing window in a webpage through a player embedded into the webpage, wherein the media resource creation module is configured for adding different tracks in a fragmented media file into an identical source buffer object in the media source object; transmit a virtual address taking the media source object as a data source to a media element of the webpage; call the media element to parse the media source object associated with the virtual address, wherein the media resource play module is configured to read tracks in the source buffer object of the associated media source object, and decode and play the tracks.

In another aspect, an embodiment of the disclosure further provides a synchronously playing device of a media file, including: a memory configured for storing executable instructions; and a processor configured for executing executable instructions stored in the memory to implement a synchronously playing method of a media file according to embodiments of the disclosure.

In another aspect, an embodiment of the disclosure further provides a storage medium, where an executable instruction is stored, and when the executable instruction is executed, the storage medium performing operations comprising: creating a media source object corresponding to a playing window in a webpage by a player embedded in the webpage; adding different tracks in a fragmented media file into an identical source buffer object in the media source object; transmitting a virtual address taking the media source object as a data source to a media element of the webpage; calling the media element to parse the media source object associated with the virtual address; and reading tracks in the source buffer object of the associated media source object, and decoding and playing the tracks.

Based on the above, the embodiment of the disclosure has the following beneficial effects:
1) the fragmented media file converted from the media data in the media file of the non-streaming media format is transmitted to the media element of the webpage through the media source extension interface of the webpage for being decoded and played, so that the media file of the non-streaming media format is played through the webpage, and the restriction that a file of the non-streaming media format may not be independently played until it is completely downloaded is overcome;
2) the media data is converted into the fragmented media file through the player of a front-end webpage, and a background server needs to store media files of different resolutions, and the fragmented media file does not need to be pre-stored on the server side, thereby playing the media file in a way of occupying a small storage space; and
3) the different tracks in the fragmented media file are added to the same source buffer object in the media source object, so that the different tracks are synchronously played, and the defect that sounds and pictures of a media file played through the media source extension interface are asynchronous in the prior art is overcome.

DETAILED DESCRIPTION

In order to make the objectives, technical solutions and advantages of the disclosure clearer, the disclosure will be further described in detail below with reference to the accompanying drawings. Embodiments described shall not be construed as limiting the disclosure. All other embodiments obtained by those of ordinary skill in the art without paying creative work shall fall within the protection scope of the disclosure.

Unless otherwise defined, all technical and scientific terms used herein are the same as meanings of general understandings of those skilled in the art of the disclosure. The terms used herein are merely to describe the specific embodiments, not intended to limit the disclosure.

Before the disclosure is further described in detail, the nouns and terms involved in the embodiments of the disclosure are explained, and the nouns and terms involved in the embodiments of the disclosure are applied to the following explanations.

1) Media file, a file storing encoded media data (for example, at least one of audio data and video data) in a container (also called a box), and further comprising metadata to express media information to ensure that media data is correctly decoded.

For example, a media file formed by encapsulating media data in an MPEG (Moving Picture Experts Group)-4 package format is referred to as an MP4 file. Typically, an Advanced Video Coding (AVC or H.264) or MPEG-4 (Part 2) coded video data and an Advanced Audio Coding (AAC) coded audio data are stored in an MP4 file, of course, other encoding methods for video and audio are not excluded.

Figure 1:
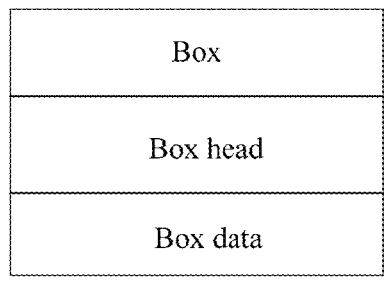
FIG. 1 is a schematic diagram of an optional structure of a box for packaging a multimedia file, provided by an embodiment of the disclosure.

2) Container (Box), also called boxes, an object-oriented component defined by a unique type identifier and length. Referring to FIG. 1, an optional structural diagram of a container provided by an embodiment of the disclosure, including a container header (Box Header) and container data (Box Data) filled with binary data for expressing various information.

Figure 2:
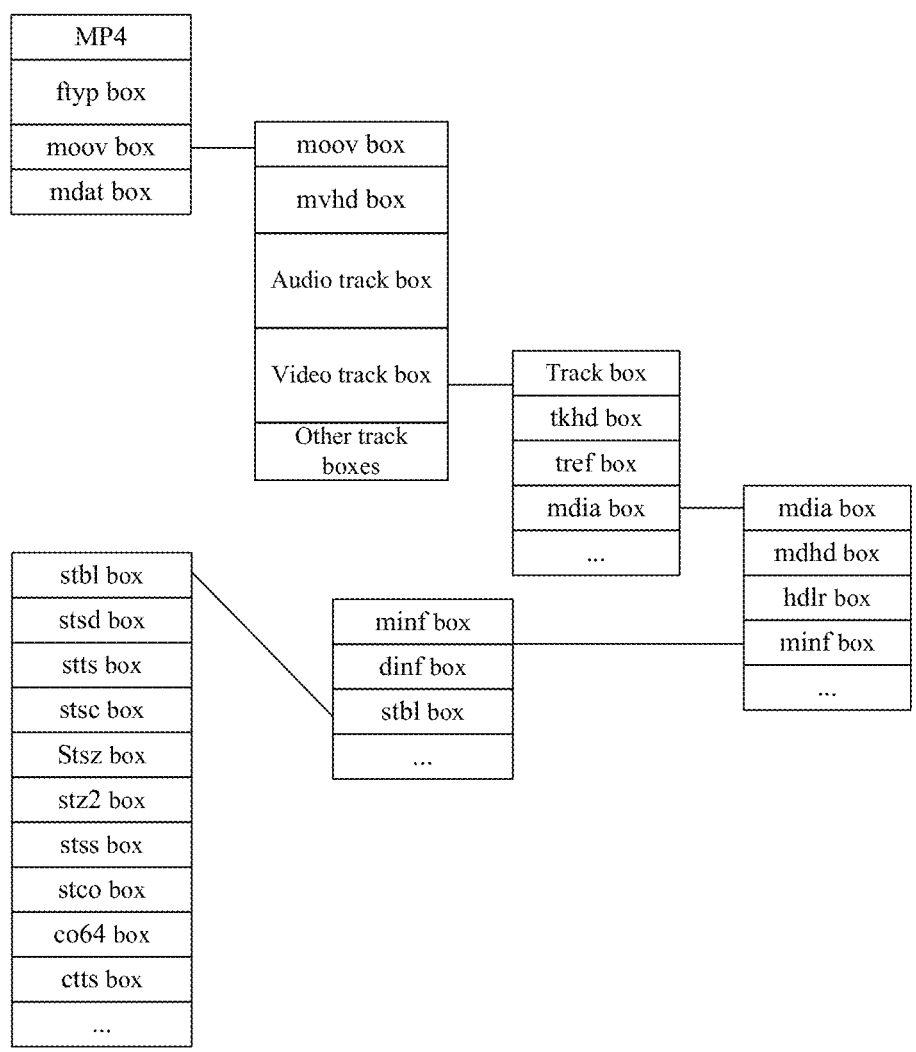
FIG. 2 is a schematic diagram of an optional packaging structure of an MP4 file in an embodiment of the disclosure.

The container header includes a size and a type, the size indicates the length of the container in the media file, and the type indicates the type of the container. FIG. 2 is a schematic diagram of an optional package structure of an MP4 file according to an embodiment of the disclosure. The basic container types involved in the MP4 file include the file type container (ftyp box), the metadata container (moov box), and the media data container (mdat box).

The container data part can store specific data. At this time, the container is called a "data container", and the container data part can further encapsulate other types of containers. At this time, the container is called a "container container".

3) Track, also called a Stream, related to the time-ordered samples (Sample) in the media data container. For media data, a track represents a sequence of video frames or a sequence of audio frames, and may also include a caption track synchronized with a sequence of video frames. A set of consecutive samples in the same track being called blocks.

4) File type container, a container for storing the size (that is, the length of the occupied bytes) and type of the file in the media file. As shown in FIG. 2, the file type container is labeled "ftyp box", where the stored binary data describes the file type and compatibility according to the standard byte length.

5) Metadata container, a container for storing metadata (ie, data describing multimedia data stored in a media data container) in a media file, and information expressed by binary data stored in a metadata container in an MP4 file is referred to as media information.

As shown in FIG. 2, the header of the metadata container uses binary data to indicate that the container type is "moov box", the container data part encapsulates the mvhd container for storing the overall information of the MP4 file, which is independent of the MP4 file and related to the playback of the MP4 file, including duration, creation time, and modification time.

The media data container of the media file may include a sub-container corresponding to a plurality of tracks, such as an audio track box and a video track box. References and descriptions of the media data of the corresponding track are included in the audio track container and the sub-container of the video track container, and the necessary sub-containers include: a container for describing the characteristics of the track and overall information (such as duration, width and height) (denoted as tkhd box), a container for recording the media information of the track (such as media type and sampled information) (denoted as mdia box).

For the sub-container encapsulated in the mdia box, it may include: a container for recording the relevant attributes and contents of the track (denoted as mdhd box), a container for recording the playback process information of the medium (denoted as hdlr box), and a container for describing the media information of the media data in the track (denoted as minf box). Minf box also encapsulates a sub-container (denoted as dinf box) for interpreting how to locate media information, and a sub-container (recorded as stbl box) for recording all time information (decoding time/display time), position information, and codec in the track.

Figure 3:
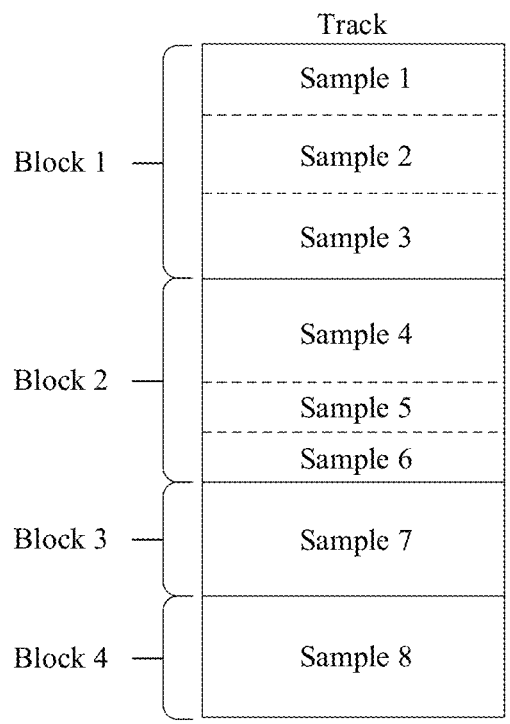
FIG. 3 is a schematic diagram of an optional structure for storing media data by a media data box in a media file in an embodiment of the disclosure.

Referring to FIG. 3, is a schematic structural diagram of media data container storage media data in a media file according to an embodiment of the disclosure. Using the media information identified from the binary data in the stbl box, the time, type, capacity of the sample and the position in the media data container can be explained. The following describes the sub-containers in the stbl box.

The stsd box contains a sample description table. According to different coding schemes and the number of files storing data, there may be one or more description tables in each media file. The description table can be used to find the description information of each sample. The description information of each sample can be found through the description table, the description information can ensure the correct decoding of the samples, and different media types store different description information. For example, in the case of video media, the description information is the structure of the image.

The stts box stores the duration information of the sample, and provides a table to map the time (decoding time) and the serial number of the sample. Through the sttx box, the sample can be located at any time in the media file. The stts box also uses other tables to map the sampled capacity and pointer, each entry in the table provides the sequence number of consecutive samples in the same time offset, as well as the offset of the sample. By incrementing these offsets, a complete time-sampling mapping table can be created. The calculation formula is as follows:

$$DT(n+1)=DT(n)+STTS(n) \qquad (1)$$

Wherein STTS (n) is the duration of the nth sample, DT (n) is the display time of the nth sample. The arrangement of the samples is sorted in chronological order so that the offset is always non-negative. DT generally starts at 0, taking the display time DT(i) of the ith sample as an example. The calculation formula is as follows:

$$DT(i)=SUM(\text{for } j=0 \text{ to } i-1 \text{ of delta}(j)) \qquad (2)$$

The sum of all offsets is the length of media data in the track.

The stss box records the sequence number of the keyframe in the media file.

The sts box records the mapping relationship between the sampled and stored samples, and maps the relationship between the serial number of the sample and the serial number of the block through the table. By looking up the table, the block containing the specified sample can be found.

The stco box defines the position of each block in the track, the position being represented by the offset of the starting byte of the media data container, and the length (i.e., capacity) relative to the starting byte.

The stsz box records the capacity (i.e. size) of each sample in the media file.

6) Media data container, a container for storing multimedia data in the media file, for example, a media data container in the MP4 file. As shown in FIG. 3, the sampling the unit stored in the media data container, stored in the block of the media file, the length of the block and the sample may be different.

7) Fragmented media files, sub-files formed by segmentation of media files, each fragmented media file can be independently decoded.

Taking the MP4 file as an example, the media data in the MP4 file is segmented according to the key frame, and the segmented media data and the corresponding metadata are encapsulated to form a segmented MP4 (FMP4, Fragmented MP4) file. The metadata in each FMP4 file ensures that the media data is correctly decoded.

Figure 4:
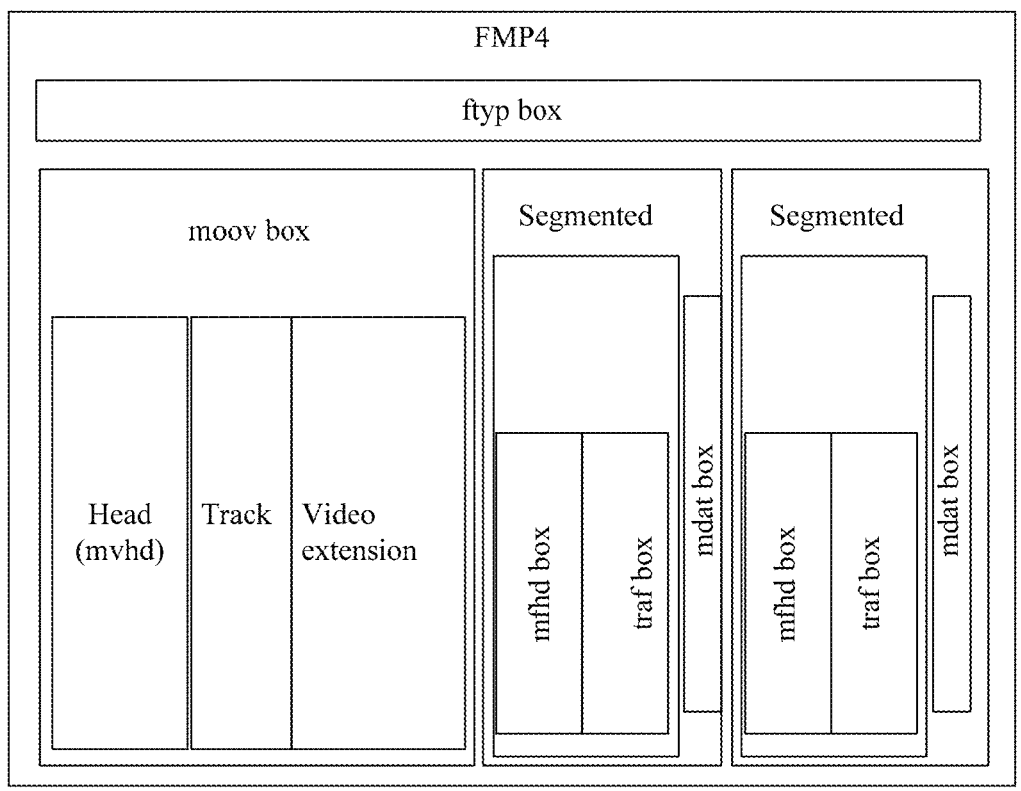
FIG. 4 is a schematic diagram of an optional packaging structure of an FMP4 file in an embodiment of the disclosure.

For example, when converting an MP4 file as shown in FIG. 2 into a plurality of FMP4 files, refer to FIG. 4, which is an optional package structure diagram of an FMP4 file provided by an embodiment of the disclosure, where an MP4 file can be converted into multiple FMP4 files, each FMP4 file consists of three basic containers: a moov container, a moof container, and a mdat container.

The moov container includes MP4 file level metadata to describe all media data in the MP4 file from which the FMP4 file originates, such as the duration, creation time, and modification time of the MP4 file.

The moof container stores segment-level metadata for describing the media data encapsulated in the FMP4 file to ensure that the media data in FMP4 can be decoded.

One moof container and one mdat container make up one segment of the segmented MP4 file. One or more such segments may be included in a segmented MP4 file, and the metadata encapsulated in each segment ensures that the media data encapsulated in the segment can be independently decoded.

8) Media Resource Extensions (MSE) interface, which is a player-oriented interface implemented in webpages and is realized by the browser's interpreter and executing a front-end programming language (such as JavaScript) during loading in a webpage. The player is provided with a function of calling a playback media stream of a Hypertext Markup Language (HTML) media element (Media Element), for example, using a video element <video>, and an audio element <audio> to implement a video/audio playback function.

9) Streaming media format, a media file which encapsulates the media data into the streaming media. The media file does not have to be completely downloaded, and does not require additional transcoding, and can be decoded and played, that is, a packaging technology that natively supports downloading while playing. Typical streaming media files include: TS media file fragmentation based on HTTP live streaming (HLS, HTTP Live Streaming) technology, FLU (Flash Video) files, and the like.

10) Non-streaming media format, a encapsulation technology that encapsulates media data into media files and can be decoded and played after the media files are completely downloaded. Typical non-streaming media files include: MP4 files, Windows Media Video (WMV) file, advanced streaming format (ASF) files.

It should be noted that the MP4 file does not natively support playback in streaming form, but the technical effect of playing while downloading and playing the media stream after transcoding the player after online transcoding or the missing part of the partially downloaded MP4 file is filled with invalid binary data, the package format of the file that does not support streaming media playback in this article is It is called a non-streaming format.

First, the synchronously playing device of an embodiment of the disclosure will be introduced. The analyzing device of the moov box can be provided as hardware, software or a combination of hardware and software.

Figure 5:
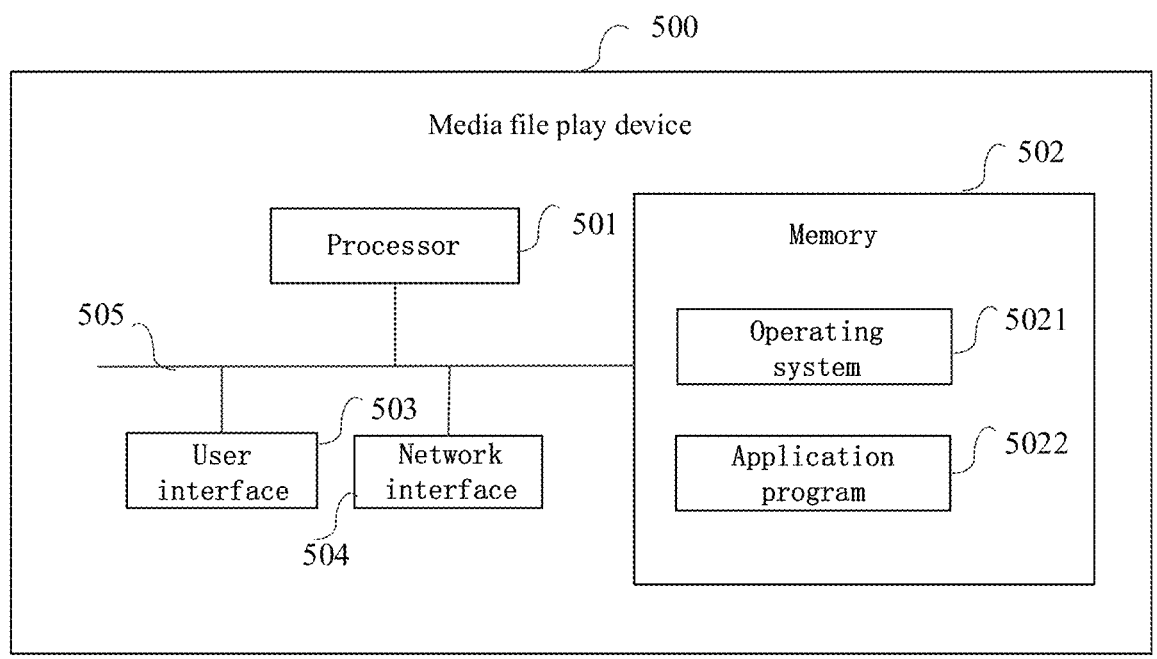
FIG. 5 is an optional schematic constitution diagram of a synchronously playing device of a media file according to an embodiment of the disclosure.

An embodiment of the combination of hardware and software of the synchronously playing device for media files will be illustrated as follows: Referring to FIG. 5, FIG. 5 is an optional schematic view of a synchronously playing device for media files in an embodiment of the disclosure. A synchronously playing device for media files 500 can be a mobile phone, a computer, a digital broadcasting terminal, a message transmitter-receiver, a game controller, a tablet, a medical facility, a fitness facility, a personal digital assistant with the function of playing videos and so on. The synchronously playing device for media files 500 as shown in FIG. 5 includes at least one processor 501, a memory 502, at least one network interface 504 and a user interface 503. Various components in the synchronously playing device for media files 500 are coupled together by a bus system 505. Conceivably, the bus system 505 is utilized to connect and communicate the components. Besides the bus, the bus system 505 further includes a power bus, a control bus and a status signal bus. But for the sake of clear illustration, all sorts of buses in FIG. 5 are marked as the bus system 505.

The user interface 503 can include a display, a keyboard, a mouse, a trackball, a click wheel, a key, a button, a touch panel or a touch screen.

Conceivably, the memory 502 can be a volatile memory or a nonvolatile memory, or both. The nonvolatile memory can be a read only memory (ROM), a programmable read-only memory (PROM), an erasable programmable read-only memory (EPROM), an electrically erasable programmable read-only memory (EEPROM); magnetic memory can be a disk memory or a tape memory. The volatile memory can be a random access memory (RAM), which is used as an external cache. The illustration is exemplary, rather than limitation. Many forms of RAMs are available, such as a static random access memory (SRAM), a synchronous static random access memory (SSRAM), a dynamic random access memory (DRAM), a synchronous dynamic random access memory (SDRAM). The memory 502 provided in embodiments of the disclosure is aimed at including aforementioned and other suitable memories.

The memory 502 in an embodiment of the disclosure includes but not limited to a ternary content-addressable memory (TCAM), a static random access memory, which can store media file data obtained from a server to support the operation of the synchronously playing device for media files 500. Examples of the data include any computer program run over the synchronously playing device for media files 500, such as an operating system 5021, an application program 5022, and various types of media file data information. The operating system 5021 includes a variety of system programs, such as a frame layer, a core library layer, a driver layer, configured for supporting various basic services and handling missions based on hardware. The disclosure program 5022 can include all sorts of disclosure programs, such as a client with a synchronously playing function of a media file, or an application, etc. Programs with synchronously playing methods for media files in embodiments of the disclosure can be included in the disclosure program 5022.

Methods disclosed by embodiments of the disclosure are acquired by the processor 501. The processor 501 can be an integrated circuit chip with abilities to process signals. During the process, the synchronously playing methods for media files provided by embodiments of the disclosure can be fulfilled by an integrated logic circuit of hardware or manipulation of software in the processor 501. The processor 501 can be a communication processor, a digital signal processor (DSP), or other programmable logic devices, a discrete gate or a transistor logic device, a discrete hardware component, etc. The processor 501 can implement or perform all methods, steps and logic diagrams provided in embodiments of the disclosure. The communication processor can be a microprocessor or any other conventional processor. Combined with steps of methods provided of embodiments of the disclosure, the result can be processed by hardware decoding processors or mixture of hardware and software in decoding processors. Software modules can be located in a storage medium. The storage medium locates in the memory 502. The processor 501 reads information in the memory 502, and runs the synchronously playing methods for media files with the aid of hardware.

In an exemplary embodiment, an embodiment of the disclosure further provides a computer readable storage medium, including the memory 502 of a computer program. The aforementioned computer program can be processed by the processor 501 of the synchronously playing device for media files 500 to run the synchronously playing methods for media files. The computer readable storage medium can be a memory such as an FRAM, an ROM, a PROM, an EPROM, an EEPROM, a flash memory, a magic memory, a compact disc, or a CD-ROM; or a device including one or more memories above, such as a mobile phone, a computer, a tablet, a personal digital assistant, etc.

The hardware achievement of the synchronously playing device for media files will be illustrated below. The synchronously playing device for media files in embodiments of the disclosure can be fulfilled by one or more disclosure specific integrated circuit (ASIC), DSP, programmable logic device (PLD), complex programmable logic device (CPLD), field-programmable gate array (FPGA) or other electrical elements, configured for performing the synchronously playing device for media files provided by embodiments of the disclosure.

The software achievement of the synchronously playing device for media files will be illustrated below. The synchronously playing device for media files in embodiments of the disclosure can be fulfilled by disclosure programs or plug-ins, or a combination of both.

As an example, an application program can be a client specific for synchronously playing for media files, or a client with an optical service of the synchronously playing function for media files, which will be activated by installing a corresponding plug-in.

As an example, the plug-in can upgrade installation package for disclosure programs and the function of synchronizing play the media files in the disclosure for non-media playback.

Figure 6:
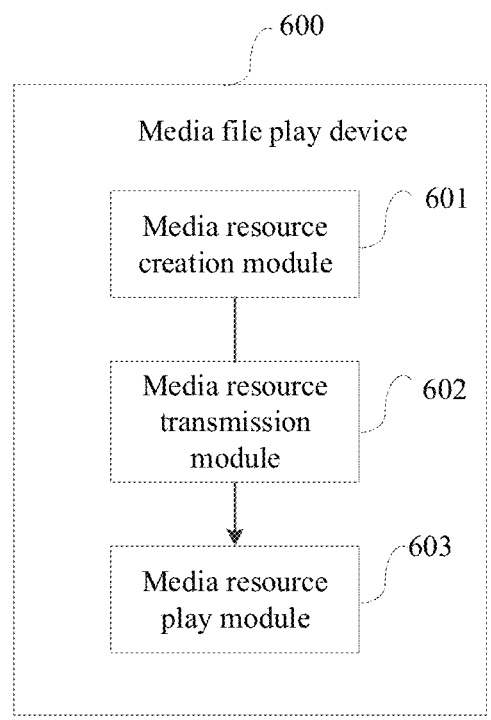
FIG. 6 is an optional schematic constitution diagram of a synchronously playing device of a media file according to an embodiment of the disclosure.

As an example of hardware implementation or software implementation of a synchronously playing device of a media file, the synchronously playing device of the media file may provide a series of modules having a coupling relationship at signal/information/data levels, which will be described below with reference to FIG. 6. Referring to FIG. 6, FIG. 6 is an optional schematic constitution diagram of a media file play device according to an embodiment of the disclosure, illustrating a series of modules included in the synchronously playing device of the media file, but the module structure of the synchronously playing device of the media file is not limited to FIG. 6. For example, modules therein may be further split or merged depending on different functions implemented. The functions implemented by the modules shown in FIG. 6 will be described below.

A media resource creation module 601 is configured for creating a media source object corresponding to a playing window in a webpage through a player embedded into the webpage, and add different tracks in a fragmented media file to the same source buffer object in the media source object.

A media resource transmission module 602 is configured for transmitting a virtual address taking the media source object as a data source to a media element of the webpage.

A media resource play module 603 is configured for calling the media element to parse the media source object associated with the virtual address, read the tracks in the source buffer object of the associated media source object, and decode and play the tracks.

In some embodiments, the media resource creation module 601 is configured for extracting a video track from the fragmented media file and an audio track synchronized with the video track, and add the extracted video track and audio track to the same source buffer object in the media source object. The source buffer object is created for the playing window that receives a playing event in the webpage.

In some embodiments, the media resource creation module 601 is also configured for adding a subtitle track synchronized with the extracted video track to the same source buffer object.

In some embodiments, the media resource play module 603 is also configured for calling a video element of the webpage to decode and play the video track and the subtitle track which are added into the source buffer object, and synchronously call an audio element of the webpage to decode and play the audio track added into the source buffer object.

In some embodiments, the media resource creation module 601 is also configured for acquiring media data, corresponding to a given period, in the media file in response to the playing event, corresponding to the media file, in the webpage, and create, based on the acquired media data, the fragmented media file for independent decoding.

In some embodiments, the media resource creation module 601 is also configured for acquiring a fragmented media file with target resolution, clear away the fragmented media file, which is added into the source buffer object and is not decoded and played, of an original resolution, and add the fragmented media file with target resolution to the same source buffer object in the media source object, so as to continue to play the fragmented media file with target resolution at the playing point at the end of the currently played fragmented media file with original resolution.

In some embodiments, the media resource creation module 601 is also configured for acquiring the fragmented media file with target resolution according to update of network parameters of the player to adapt to the update of the network parameters, and acquire the fragmented media file with target resolution in response to a resolution switching event received in the playing window according to the target resolution indicated by the resolution switching event.

Figure 7:
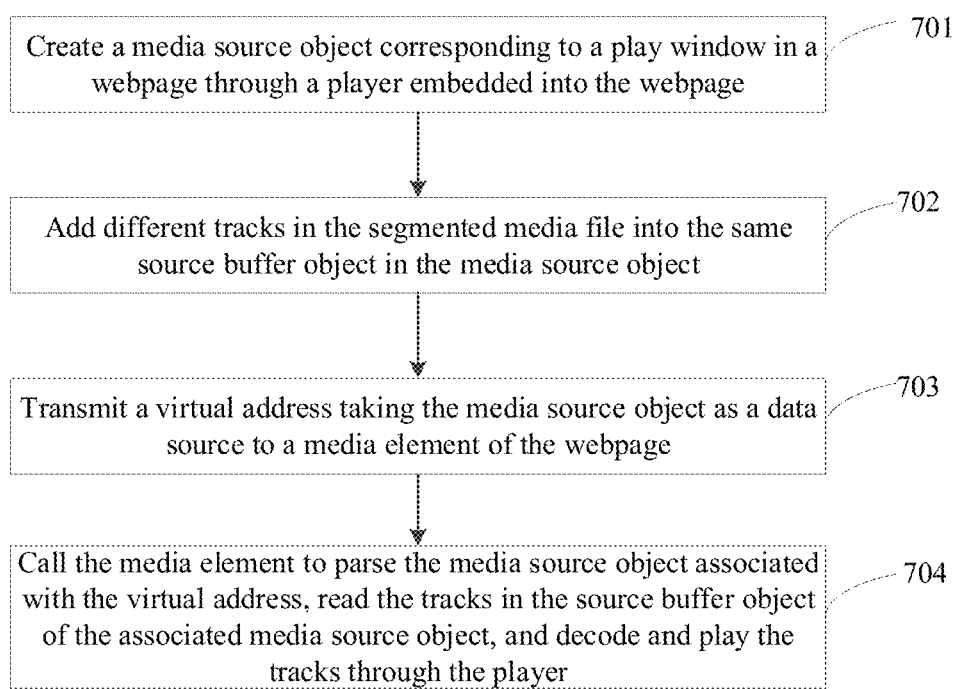
FIG. 7 is an optional schematic flow diagram of a synchronously playing method of a media file, provided by an embodiment of the disclosure.

In some embodiments, the player creates and calls the media source object corresponding to the playing window in the webpage through the player embedded into the webpage, reads the tracks in the source buffer object of the associated media source object, and decodes and plays the media resource. Referring to FIG. 7, FIG. 7 is an optional schematic flow diagram of a synchronously playing method of a media file, provided by an embodiment of the disclosure, which will be described with reference to steps shown in FIG. 7.

In some examples recorded in the following text, a Moving Picture Experts Group (MPEG)-4 media file is taken as an example. According to the implementation of the MPEG-4, implementation on other non-streaming media formats may be easily foreseen.

Step 701, a media source object corresponding to a playing window in a webpage is created through a player embedded into the webpage.

For example, when the player receives a playing event of a media file from the playing window in the webpage (the player corresponds to the playing window), the player executes a media source method through an MSE to create a media source object, and executes an add source buffer method packaged in a media source extension interface to create a buffer of the media source object, namely a source buffer object. One media source object has one or more source buffer objects, and each source buffer object may correspond to one playing window in the webpage to receive a to-be-played fragmented media file in the window.

Step 702, different tracks in the fragmented media file are added into the same source buffer object in the media source object.

In a process of implementing this disclosure, the applicant finds that when the fragmented media file is played, if a video track and an audio track of the fragmented media file are in different source buffer objects, the audio track and the video track in different source buffer objects cannot be synchronized with each other during playing. However, by implementing the solution of adding the video track and the audio track to the same source buffer object in the media source object as described in Step 702, it is found that this defect can be effectively overcome.

In some embodiments, the video track and the audio track synchronized with the video track are extracted from the fragmented media file, and the extracted video track and audio track are added to the same source buffer object in the media source object. The source buffer object is created for the playing window that receives the playing event in the webpage. Video and audio synchronization is realized by adding the extracted video track and audio track to the same source buffer object in the media source object, thus avoiding the defect that a media file played through a source buffer only has a video frame or an audio frame.

For example, the following tracks, including (a) a video track and an audio track, and (b) a video track, an audio track and a subtitle track, in the fragmented media file are added to the same source buffer object in the media source object according to whether the fragmented media file includes a subtitle track. Therefore, when the media file includes the subtitle track, the subtitle track and a subtitle track synchronized with the extracted video track are added to the same source buffer object, so that subtitles, videos and audios can be synchronously output.

Figure 8:
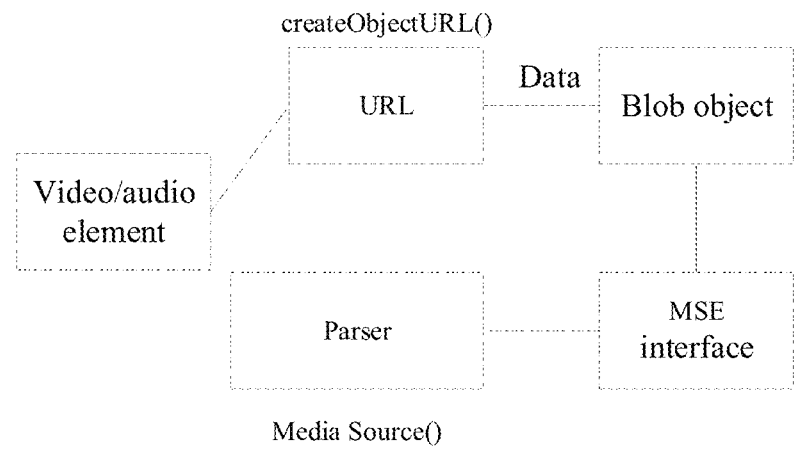
FIG. 8 is an optional schematic diagram for playing, by a player, a fragmented media file through a media source extension interface of a webpage, provided by an embodiment of the disclosure.

As shown in FIG. 8, in the process of playing the media file, a parser in the player parses newly acquired media data to continuously construct new fragmented media files, and executes an append buffer method of the source buffer object to add tracks of the fragmented media files to the source buffer object of the same media source object.

In some embodiments, if the fragmented media file is a streaming media file, a play request is configured for asking a server for the fragmented media files within a given period (a real-time playing point for following the player), and the fragmented media files are transmitted to a media element of the webpage through the media resource extension interface of the webpage for decoding, thereby realizing continuous playing of the media file.

For example, the given period may be a pre-load duration for pre-loading part of the media file after the playing point to achieve a fluent watch experience. The length of the given period may be fitted to the network parameters or characteristic parameters of host equipment through the player, so as to realize optimal utilization of terminal resources and/or network resources.

For example, the given period may also be a length of at least one content unit after the playing point. The content unit is divided and formed according to characters, scenes and plots in the media file, and is configured for denoting changes of contents in the media file, so as to avoid unnecessary flow consumption to the maximum extent due to the fact the given period is skipped by a user.

In some embodiments, if the fragmented media file is in a non-streaming media format, media data, corresponding to the given period, in the media file may be acquired in response to the playing event, corresponding to the media file, in the webpage, and the fragmented media file for independent decoding is constructed on the basis of the acquired media data.

In some embodiments, on the circumstance that the fragmented media file is in the non-streaming media format, when the player acquires the fragmented media file, two key frames in the to-be-played media file may be determined on the basis of a real-time playing point in the process of playing the media file. A network request is transmitted to the server. The network request is configured for asking to acquire media data between the two key frames in the media file. The fragmented media file capable of being independently decoded and played may be constructed through the acquired media data, and is transmitted to the media element of the webpage through the media resource extension interface of the webpage for decoding, thereby realizing continuous playing of the constructed fragmented media file.

The two key frames determined on the basis of the playing point are continued to be described. In the process of playing the media file by the player, the media file is played by loading the data between the key frames, that is, the player takes the media data between the two key frames as a play loading unit. The playing point may be a play moment reached by continuously playing the media file (that is, the media file is naturally played without intervention of the user), such as a playing point from the 30th minute to the 40th minute. Or, the playing point may be a play moment when the media file is displayed in a skip way (that is, the user clicks a progress bar through a cursor to realize page skip). For example, the original playing point is 20 percent of a play progress, and the skipped playing point is 30 percent of the play progress.

In actual disclosure, the two key frames determined on the basis of the playing point may be two adjacent key frames in the media file, or one or more other key frames exist between the two key frames. The quantity of key frames between the two key frames may be determined according to the buffer performance of the browser (such as the capacity of an available buffer), the network performance (a network bandwidth) and the like, and may also be set according to an actual requirement.

In some embodiments, on the circumstance that the playing point is the play moment reached by continuously playing the media file, a method of determining the two key frames (a first key frame and a second key frame having the decoding time later than that of the first key frame) is described according to whether a video frame corresponding to the playing point is a common frame or a key frame.

On the circumstance 1) that the video frame corresponding to the playing point is the common frame, since the player takes the media data between the two key frames as a basic play loading unit, the media data after the playing point and before a start key frame (the decoding time is later than that of a key frame, closest to the playing point, in the key frames of the playing point) after the playing point is loaded media data. In order to avoid repeated acquisition of this part of loaded media data, the first key frame in the two key frames of the given period is: the start key frame, having the decoding time after the playing point, in the media file; and the second key frame in the two key frames is: a key frame, having the decoding time later than that of the first key frame, in the media file.

On the circumstance 2) that the video frame corresponding to the playing point is the key frame, the first key frame in the two key frames is: a key frame corresponding to the playing point, namely a key frame aligned with the time of the playing point; and the second key frame in the two key frames is: a key frame, having the decoding time later than that of the first key frame, in the media file.

On the above circumstance 1), a key frame spanning the playing point is used as an end point of the media data, which may ensure that the video frame corresponding to the playing point has enough information for correct decoding and no phenomenon of frame skip caused by lack of decoding data (namely the key frame) occurs.

In another embodiment, on the circumstance that the playing point is the play moment reached through the skip way, a method of determining the two key frames (a first key frame and a second key frame having the decoding time later than that of the first key frame) is described according to whether a video frame corresponding to the playing point is a common frame or a key frame.

On the circumstance 1) that the video frame corresponding to the playing point is the common frame, since the playing point is reached by skip, the media data between the start key frame before the playing point and the playing point is not loaded, and the first key frame is: a start key frame, having the decoding time earlier than the playing point, in the media file, namely a key frame which has the decoding time searched in the time (namely a corresponding relationship between a serial number represented by media information and the decoding time of a frame) of the media data and earlier than the start time of the given period and is closest to the start time; and the second key frame in the two key frames is: a key frame, having the decoding time later than that of the first key frame, in the medium file. Additional requesting the media data between the playing point and the key frame before the playing point may ensure that normal decoding may be achieved at any playing point, and the phenomenon of frame skip caused by failure of decoding when the playing point corresponds to the common frame is avoided.

On the circumstance 2) that the video frame corresponding to the playing point is the key frame, the first key frame is: a key frame corresponding to the playing point, namely a key frame which has the decoding time searched in the time (namely a corresponding relationship between a serial number represented by media information and the decoding time of a frame) of the media data and aligned with the time of the playing point; and the second key frame in the two key frames is: a key frame, having the decoding time later than that of the first key frame, in the media file.

On the above circumstance 1), a key frame spanning the playing point is used as an end point of the media data, which may ensure that the video frame corresponding to the playing point has enough information for correct decoding and no phenomenon of frame skip caused by lack of decoding data (namely the key frame) occurs.

On the circumstance 2), to-be-acquired media data is defined by the key frame aligned with the playing point. On the premise that the media data may be correctly decoded at the playing point, acquisition of unnecessary media data is reduced to the maximum extent, and occupancy of connections and flow is reduced, thus guaranteeing the instantaneity of non-media play services in the webpage.

In some embodiments, the network request transmitted by the player to the server carries an offset and a capacity of the media data between the two key frames requested, so that the server extracts media data that starts from the offset and conforms to the capacity from the media file, and returns it to the player. Therefore, the player needs to determine the offset and the capacity of the media data in the media file according to media information (such as positions of video/audio frames, the offset and the decoding time) identified from metadata of the media file before transmitting the network request. Before the offset and the capacity are determined, first of all, the media information needs to be identified from the metadata of the media file.

Then, the offset and the capacity, which are determined on the basis of the identified media information, of the media data in the media file are described. In some embodiments, the player may determine the offset and the capacity of the media data in the media file through the following method: an offset and capacity of a video frame (namely the video frame between the first key frame and the second key frame) of the media data in the media file, and an offset and capacity of an audio frame aligned with the video frame in the media file are determined on the basis of the identified media information; and an offset and capacity of a target range (a range composed of a minimum offset and a maximum capacity) including the above video frame and audio frame are determined. The target range includes the above video frame and the audio frame.

A method of searching the foregoing audio frame aligned with the video frame is described here. The video frame is used as a reference. An audio frame time-synchronized with the video frame is positioned according to the start time and the time length of the media data, so as to ensure that the decoding start time of a first audio frame in the media data is not later than the decoding start time of a first video frame and the decoding time of a last audio frame is not earlier than the decoding end time of a last video frame. In this way, the problem of inconsistency of videos and audios in time length in the media file may be solved, so as to ensure that each frame of video is played with synchronized audio, and the phenomenon that there are pictures without sound is avoided.

When the player requests the media data from the server, the play request carries the position (denoted by the offset and the capacity of the target range) of the media data in the given period in the media file. The following describes a method of determining the target range. The player positions the video frame in a metadata box through the offset and the capacity of the video frame, between the first key frame and the second key frame in the two key frames, in the media file, and positions the audio frame in the metadata box through the offset and the capacity of the audio frame aligned with the video frame in the media file. A range composed of upper limits and lower limits of the positions is taken as the target range, namely a range composed of the minimum offsets and the maximum capacities. The offset and the capacity which correspond to the upper limits of the positions are the offset and the capacity which correspond to the upper limit of the target range, and the offset and the capacity which correspond to the lower limits of the positions are the offset and the capacity which correspond to the lower limit of the target range. In actual disclosure, the target range is a minimum range that stores the video frame and the audio frame in the media data box of the media file with target resolution. For example, a range corresponding to the offset of the position of the video frame between the first key frame and the second key frame on the media file with target resolution is [a, b] (the address is in an ascending order), and a range corresponding to the offset of the position of the audio frame on the media file with target resolution is [c, d] (the address is in a descending order), so that the range composed of the upper limits and the lower limits of the positions is [min(a, c), max(b, d)]. In this way, the player transmits the network request carrying the offset and the capacity of the target range to the server, so as to request the media data of the target range. The server extracts the media data in the media file based on the offset and the capacity of the target range and then returns the media data of the target range at one time without secondary acquisition, so that the number of times of requesting of the player is decreased, and the processing efficiency is improved.

In some embodiments, a processing method of switching the resolution of a played media file by the player in the playing process is described. The player acquires a fragmented media file with target resolution, clears away the fragmented media file, which is added into the source buffer object and is not decoded and played, of an original resolution, and adds the fragmented media file with target resolution to the same source buffer object in the media source object, so as to continue to play the fragmented media file at the end of the currently played fragmented media file with original resolution. By clearing away the fragmented media file, which is added into the source buffer object and is not decoded and played, of the original resolution, when the user switches the resolution, a media file meeting the requirement of the target resolution may be displayed to the user in time.

For example, the player may detect network parameters in the process of playing the media file with original resolution, and determines the fragmented media file with target resolution needing to be switched according to update of the network parameters of the player, so as to adapt to the update of the network parameters. Or, the player may acquire a fragmented media file of a corresponding target resolution in response to a resolution switching event received from the playing window and triggered by the user according to the target resolution indicated by the resolution switching event.

As an example, the network parameters may include: an idle downlink bandwidth parameter, the quantity of connection terminals and the like. The player may calculate a playing point pre-loading fixed time period that enables the player to be relatively real time according to changes of the network parameters, so that the maximum resolution may be realized, and fragmented media files of the maximum resolution are further continuously acquired. The use experience of the user may be enhanced by achieving the optimal play effect under fluent playing.

The following describes a process that the player converts an MP4 file into an FMP4 file and plays the FMP4 file through the media source extension interface on the webpage.

Figure 9:
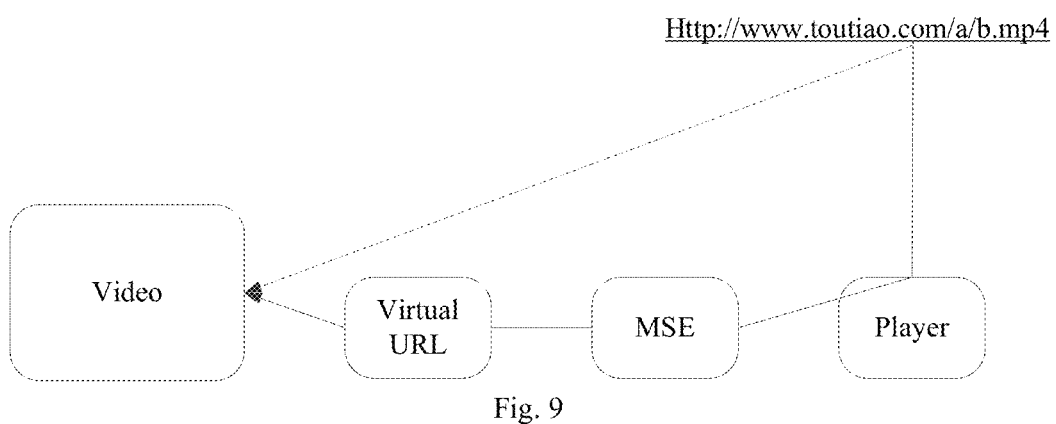
FIG. 9 is a schematic diagram of converting an MP4 file into an FMP4 file and playing the FMP4 file through a media source extension interface, provided by an embodiment of the disclosure.

Referring to FIG. 9, FIG. 9 is a schematic diagram of converting the MP4 file into the FMP4 file and playing the FMP4 file through the media source extension interface, provided by an embodiment of the disclosure. The player asks for acquiring partial media data from the MP4 file from the server based on a real address (http://www.toutiao.com/a/b.mp4) of the media file, such as data having the decoding time within the given period following the playing point.

The player constructs the FMP4 file based on the acquired media data, and then adds it to the source buffer object corresponding to the media source object. Since a virtual URL (Uniform Resource Locator) is bound to the media source object, when the player calls a code of an audio/video element and executes the code, the audio/video element reads new FMP4 files that are continuously added from the source buffer object of the media source object, and decodes the files to continuously play the media file. The media element of the webpage acquires the media source object based on the virtual URL to play the media file, instead of acquiring the media data based on a real address of the media file. In this way, the real address of the media file is protected.

On a circumstance that the fragmented media file is packaged on the basis of the media data between the key frames, the player needs to determine the offset and the capacity of the media data of the given period in the media file according to the media information of the media file, and then requests the media data from the server according to the offset and the capacity to package the fragmented media file. Then, a method for parsing the media information by the player is described.

In some embodiments, the player may parse the media information from the media information by the following method of: requesting data in a media file corresponding to a set offset and a set capacity from the server (namely requesting data of a fixed capacity), identifying metadata in the metadata box from the data returned by the server, and parsing the identified metadata to obtain the media information of the media data packaged in the media data box configured for describing the media file.

The set capacity may be statistically obtained according to the capacity of a file type box of an existing media file and the capacity of the metadata box, so that the set capacity may cover a sum of the capacity of the file type box of a set proportion (such as all) of the media file and the capacity of the metadata box to ensure that when the packaging structures of the media file are the file type box, the metadata box and the media data box for sequential package, intact metadata packaged in the metadata box may be obtained through one request, thereby saving the occupancy of connections during network transmission and then avoiding a response delay caused by the fact that a non-media play service in the webpage fails in using the connections due to the occupancy of the connections.

An MP4 media file is taken as an example. The metadata packaged in the metadata box and obtained by the player is binary data packaged in a moov box in the MP4 file. When the packaging structure of the MP4 file includes the fytp box, the moov box and the mdat box for sequential package, the set capacity may be statistically obtained according to the capacities of the ftyp box and the moov box of an existing MP4 file, so that the set capacity may cover a sum of the binary data of the ftyp box and the moov box of a set proportion (such as all) of the MP4 file to ensure that the intact binary data included in the moov box may be requested from the server at one time under most situations.

In some embodiments, a piece of binary data starting from a zero byte in the binary data requested by the player from the server through the set offset and capacity corresponds to the file type box. The player obtains the capacity of the file type box by reading the head of the box, and obtains the type and capacity of a next box by reading the head of a second box. When the type of the second box is the metadata box, and the capacity of the returned binary data is not less than the sum of the capacity of the file type box and the capacity of the metadata box, it indicates that the binary data requested from the server through the set offset and capacity includes the metadata packaged in the metadata box. When the type of the second box is the metadata box, and the capacity of the returned binary box is less than the sum of the capacity of the file type box and the capacity of the metadata box, it indicates that the binary data requested from the server through the set offset and capacity does not include the metadata packaged in the metadata box. When the binary data requested by the player from the server through the set offset and capacity does not include the intact metadata in the metadata box, the player needs to read the capacity of the box from the binary data returned by the server, calculate the offset and capacity of the metadata box according to the head of the metadata box, and enable the calculated offset and capacity to be carried in the network request, so as to request the metadata from the server, and the server reads the binary data starting from the calculated offset from the media file according to the request and returns the data to the player if the read binary data conforms to the calculated capacity.

For example, the player reads the capacity of the box from the binary data returned by the server, and calculates the offset and capacity of the metadata box according to the head of the metadata box. There are two circumstances involved.

On the circumstance 1), when the type of the box read from the remaining binary data (that is, the data, other than the binary data of the file type box, in the returned binary data) is the metadata box, and the capacity of the remaining binary data is less than the capacity of the metadata box, a difference between the capacity of the metadata box and the capacity of the remaining binary data is calculated as a new capacity of a second request, and the sum of the offset and the capacity of the first request is used as a new offset to request binary data from the server for the second time.

On the circumstance 2), when the type of the box read from the remaining binary data is a media data box, the sum of the capacity of the media data box and the capacity of the file type box is calculated as a new offset of a second request to request binary data from the server for the second time by the set capacity (which may be an empirical value capable of covering the capacity of the metadata box).

The MP4 media file is taken as an example. The binary data requested by the player from the server through the set offset and capacity does not include the intact binary data of the moov box. At this time, the player needs to read the type and capacity of the box from the binary data returned by the server to determine the offset and capacity of the moov box in the MP4 file.

A start byte of the binary data of the MP4 file corresponds to the ftyp box all the time. The binary data of the fytp box is identified from the returned binary data, and the length of the binary data may be acquired according to the head of the ftyp box, so that binary data of a next box is read from the remaining binary data according to the specified length of the head. The box type denoted according to the head include the following several situations.

1) When the type of the box read from the remaining binary data (that is, the data, other than the binary data of the fytp box, in the returned binary data) is the moov box, and the capacity of the remaining binary data is not less than the capacity of the moov box, moov data, which starts from the offset of the moov box in the MP4 file and conforms to the capacity of the moov box in the MP4 file, in the MP4 file is acquired from the server.

2) When the type of the box read from the remaining binary data is the moov box, and the capacity of the remaining binary data is less than the capacity of the moov box, a difference between the capacity of the moov box and the capacity of the remaining binary data is calculated as a new capacity of a second request, and the sum of the offset and the capacity of the first request is used as a new offset of the second request to request binary data from the server for the second time.

3) When the type of the box read from the remaining binary data is the mdat box, a sum of the capacity of the mdat box and the capacity of the ftyp box is calculated as a new offset of a second request to request binary data at a set capacity from the server for the second time.

In this way, regardless of the type of the packaging structure of the media file, that is, regardless of the packaging order of the file type box, the metadata box and the media data box in the media file, the player may acquire the metadata in the metadata box from the server by at most two requests. The acquisition efficiency of the metadata is improved.

For example, for the MP4 file, a piece of binary data starting from a zero byte in the binary data returned by the server according to a packaging specification of the MP4 file corresponds to the ftyp box. The capacity (i.e., the length) of the ftyp box and the intact capacity of the MP4 file may be read from the head of the ftyp box according to the packaging specification of the head of the box. It is assumed that the capacity of the ftyp box is a (the unit of which is byte), head information of a subsequent box is read from a+1 to acquire the type and the capacity of the subsequent box. If the box following the ftyp box is the moov box through reading, and the capacity of the remaining binary data (a difference obtained by subtracting the capacity of the ftyp box from the set capacity) is greater than the capacity of the moov box, it is indicated that the intact binary data of the moov box has been acquired, and the metadata in the moov box may be extracted from the remaining binary data according to the offset and the capacity of the moov box.

The method of parsing the media information according to the acquired binary data of the metadata box is continued to be described. After the player acquires the metadata packaged in the metadata box from the server, in some embodiments, the player may parse the acquired metadata to obtain the media information through the following method of: orderly parsing the binary data, corresponding to the specified length of the head of the box, in the binary data of the metadata box to obtain the box type of a sub box in the metadata box and the length of box data of the sub box; and calling a parser of a type corresponding to the box type of the sub box, and orderly parsing binary data, corresponding to the length of the box data, in non-parsed data to obtain media information denoted by the box data.

The MP4 media file is taken as an example, so that the metadata box is the moov box. Referring to FIG. 2, it can be seen that a mvhd box and a track box are packaged in the moov box. Information such as the creation time, the modification time, a time scale, a play time length and default volume of the MP4 file may be obtained by parsing binary data of the mvhd box. The moov box includes a plurality of track boxes which record specific description information of each media track. For example, for a video track box, a plurality of sub boxes is nested in a plurality of layers in the video track box. The corresponding binary data is parsed on the basis of the nested structure of the video track box to obtain video frame information of the MP4 file and corresponding picture information.

The offset, read by the player at each time for the plurality of sub boxes nested in the metadata box, of the binary data is a sum of the lengths of the identified sub boxes, and the length of the read binary data conforms to the specified length of the head of the box, so that the type and the length of a currently processed sub box may be parsed.

For example, during the first reading, the binary data is read from the zero byte of the binary data of the metadata box, and the length of the read binary data conforms to the specified length of the head of the box, so that the type and the length of the first sub box may be parsed. During the second reading, by taking the length of the sub box read at the first time as an offset, the binary data is started to be read, and the length of the read binary data conforms to the specified length of the head of the box, so that the type and the length of the second sub box may be parsed.

Through the above method of reading the binary data, a returning phenomenon caused by multiple reading is avoided, and a phenomenon of second reading caused by insufficient reading is also avoided. The efficiency and the correctness of parsing are guaranteed.

In some embodiments, typical box types nested in the metadata box are pre-marked as denoting whether a box is directly configured for packaging the binary data or further package a box. For example, the mvhd box, the audio track box, the video track box and the like shown in FIG. 2 are marked as further packaging boxes, and an stts box, an stsd box and the like shown in FIG. 2 are marked as directly packaging the binary data.

For the box types marked as directly packaging the binary data, parsers which are in one-to-one correspondence to the box types are set. The parsers are configured for parsing denoted media information according to the binary data. The box types of the parsed sub boxes are compared with the pre-marked box types to obtain the following two circumstances.

On the circumstance 1), when it is determined through comparison that the box types of the sub boxes are pre-marked as directly packaging the binary data, the parsers corresponding to the box types of the sub boxes are called to parse box data in the sub boxes to obtain the media information denoted by the box data.

On the circumstance 2), when it is determined through comparison that the box types of the sub boxes are pre-marked as continuously packaging the boxes, the binary data corresponding to the sub boxes are recursively parsed according to the specified length of the head of the box in the media file till the box types of the packaged boxes in the sub boxes are pre-marked as directly packaging the binary data, the parsers corresponding to the box types of the packaged boxes in the sub boxes are called to parse the binary data byte by byte, and the length of the parsed binary data corresponds to the length of the box data of the packaged boxes in the sub boxes to obtain the media information denoted by the box data of the packaged boxes in the sub boxes.

In some embodiments, a method of recording the media information in the process of parsing the metadata box is described. When the binary data, corresponding to the specified length of the head of the box, in the binary data of the metadata box is parsed in order to obtain the box types of the sub boxes in the metadata box, objects are created according to a nested relationship between the sub boxes and the box to which the sub boxes belong and a nested relationship between the sub boxes and the boxes packaged. When the box types of the sub boxes are pre-marked as directly packaging the binary data, arrays including the media information are stored in the objects created correspondingly to the sub boxes, and the stored media information is denoted by the box data of the sub boxes.

For example, in FIG. 2, when a parsed sub box is the stts box, since the stts box is pre-marked as directly packaging the binary data, the array including the media information is stored in the object created correspondingly to the stts box, and the media information here is time length information denoted by the box data of the stts box.

In some embodiments, a method of recording the nested relationship among the sub boxes in the process of parsing the metadata box is described. When the binary data, corresponding to the specified length of the head of the box, in the binary data of the metadata box is parsed in order to obtain the box types of the sub boxes in the metadata box, if the box type is pre-marked as directly packaging the binary data, the parsed sub box is recorded in the called parsers. Examples of the recorded sub boxes are set into the sub box attribute. The sub box attribute includes the box to which the sub boxes belong, and is configured for describing the nested relationship between the sub boxes and the box to which they are belong.

For example, in FIG. 2, when the parsed sub box is the stsd box, since the stsd box is pre-marked as directly packaging the binary data, the stsd box is recorded in the parser corresponding to the stsd box, and an example of the stsd box is set into the sub box attribute of an stbl box. By parity of reasoning, a plurality of sub boxes such as the stsd box, the stts box and the stsc box which are nested in the stbl box are finally recorded in the sub box attribute of the stsd box.

In some embodiments, when it is determined through comparison that the box type of the sub box is not pre-marked, or is pre-marked as directly packaging the binary data, but no parser of the corresponding type is called, parsing of the binary data corresponding to the sub box is ignored. According to the length of the sub box, a part, corresponding to a next sub box, in the binary data is continued to be parsed.

In actual disclosure, a customized box type may appear in the media file. The progress of overall parsing of the metadata box will not be affected by the skip mode. Meanwhile, through a method of setting a parser, when the box type of the metadata box is changed, compatible parsing for a latest metadata box may be quickly realized by adding, deleting and modifying the corresponding types of parsers, which has the characteristic of flexible and fast upgrading.

Step 703, a virtual address taking the media source object as a data source is transmitted to a media element of the webpage.

In some embodiments, the player calls the media resource extension interface to create the virtual address corresponding to the media source object before transmitting the virtual address. For example, the player executes a create object URL method packaged in the media source extension interface to create the virtual address corresponding to the media source object, namely a virtual URL which packages a fragmented media file of a Blob type.

The player calls the media resource extension interface to create the virtual address corresponding to the media source object after adding the constructed fragmented media file to the media source object of the media resource extension interface. For example, the player executes the create object URL method packaged in the media source extension interface to create the virtual address corresponding to the media source object, namely the virtual URL which packages the fragmented media file of the Blob type.

In addition, the player sets the media source object as a source (src) attribute of the virtual URL, that is, the player binds the virtual URL to a media element such as a video/audio element in the webpage. This process is also known as associating the media source object to the media element in the webpage.

Step 704, the player calls the media element to parse the media source object associated with the virtual address, reads the tracks in the source buffer object of the associated media source object, and decodes and plays the tracks.

In some embodiments, the player calls a video element of the webpage to decode and play a video track and a subtitle track which are added into the source buffer object, and synchronously calls an audio element of the webpage to decode and play an audio track added into the source buffer object.

For example, for the operation that the player transmits the virtual address to the media element of the webpage, the player includes a sentence for calling the media element to play the virtual URL, such as: <audio> virtual URL. When a code, configured for calling the video element and/or the audio element of the webpage, in the player is explained and executed by the browser, the video element of the webpage reads the video track in the source buffer object of the virtual address and decodes and plays the video track, and synchronously displays the subtitle track. Meanwhile, the audio element reads the audio track in the source buffer object of the virtual address and decodes and plays the audio track. The read audio track, video track and subtitle track are located in the same source buffer object, so that video-audio synchronization can be realized.

Figure 10:
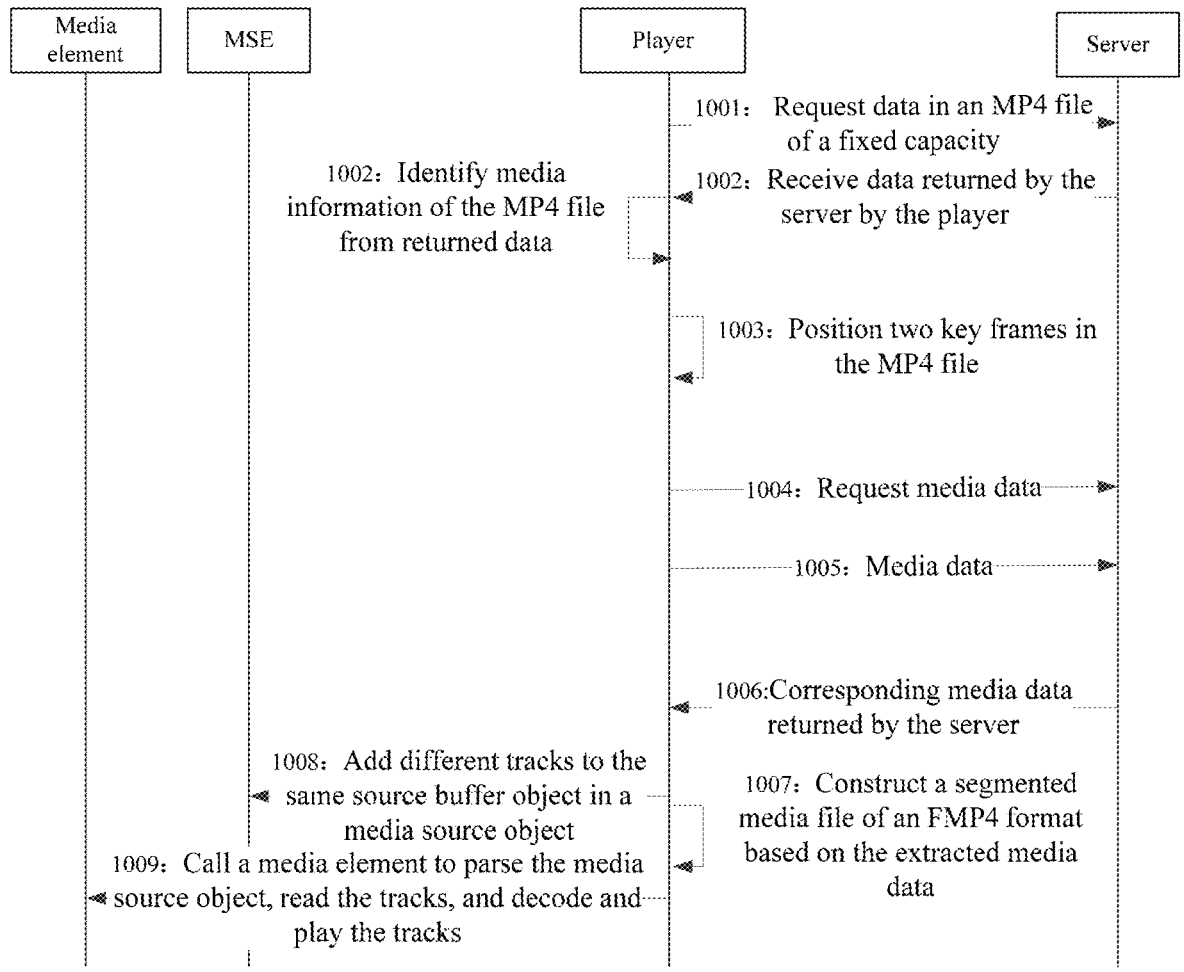
FIG. 10 is an optional schematic flow diagram of a synchronously playing method of a media file, provided by an embodiment of the disclosure.

Then, the player playing the MP4 file with the video element and the audio element of the webpage is taken as an example to describe the synchronously playing method of the media file of the embodiment of the disclosure. According to the implementation of MP4, the synchronously playing method may be easily applied to other non-streaming media formats. FIG. 10 illustrates an optional schematic flow diagram of the synchronously playing method of the media file, provided by an embodiment of the disclosure. Referring to FIG. 10, the synchronously playing method of the media file includes the steps as follows.

Step 1001: a player requests data of a fixed capacity in an MP4 file from a server according to a set offset and a set capacity.

The player transmits a data request carrying the set offset and the set capacity to the server to acquire binary data, which starts from a zero byte and conforms to the set capacity, in the MP4 file. A packaging structure of the MP4 file including a fytp box, a moov box and a mdat box for sequential package is taken as an example. The set capacity may be statistically obtained according to the capacities of the ftyp box and the moov box of the existing MP4 file, so that the set capacity may cover a sum of the ftyp box and the moov box of a set proportion (such as all) of the MP4 file to ensure that intact binary data of the moov box may be requested from the server at one time. If the intact moov data is not acquired through one request, an offset and a capacity are re-calculated for a second request.

Step 1002: the player receives data returned by the server, and identifies media information of the MP4 file from the data returned by the server.

The media information of the MP4 file includes information such as offsets, capacities and decoding time of video/audio frames in the MP4 file.

In some embodiments, the player may identify the media information of the MP4 file through the following method of: identifying the binary data of the fytp box from the data returned by the server, and reading the type and capacity of a box from the remaining binary data; when the read type of the box is the moov box, and the capacity of the remaining binary data is not less than that of the moov box, parsing the media information from the remaining binary data. Here, for the binary data returned by the server, the beginning piece of binary data inevitably corresponds to the ftyp box. According to the packaging specification of the ftyp box, the capacity (i.e., the length) and the capacity of the intact MP4 file may be read. For example, if the capacity of the ftyp box is a (the unit of which is byte), head information of a subsequent box is read from a+1 to acquire the type and the capacity of the box. In case of the moov box, a difference obtained by subtracting the capacity of the ftyp box from the set capacity is greater than the capacity of the moov box, it is indicated that the intact binary data of the moov box has been acquired, and the binary data may be parsed according to the packaging structure to reduce the media information.

In some embodiments, when the binary data returned by the server does not include the intact moov data, the capacity of the box is read from the acquired binary data, and the offset and capacity of the moov box in the MP4 file are determined. According to the determined offset and capacity, when the type of the box read from the remaining binary data is the moov box, and the capacity of the remaining binary data is not less than that of the moov box, the moov data, which starts from the offset of the moov box in the MP4 file and conforms to the capacity of the moov box in the MP4 file, in the MP4 file is acquired from the server. When the type of the box read from the remaining binary data is the moov box, and the capacity of the remaining binary data is less than that of the moov box, a difference between the capacity of the moov box and the capacity of the remaining binary data is calculated as a new capacity of a second request, and a sum of the offset and the capacity of the first request is used as a new offset to request binary data from the server for the second time.

In actual disclosure, there is a situation that the packaging structure of the MP4 file includes the fytp box, the mdat box and the moov box for sequential package. When the type of the box read from the remaining binary data is the mdat box, a sum of the capacity of the mdat box and the capacity of the moov box is a new offset of a second request to request binary data at a set capacity from the server for the second time.

Step 1003: two key frames in the MP4 file are positioned according to the identified media information and a current playing point in the process that the player plays the MP4 file through the webpage.

In the embodiment of the disclosure, the player plays videos by taking media data (at least including video data and further including audio data) between the two key frames as a loading unit, that is, the player plays the MP4 file by loading the media data between the two key frames. There may be common frames between the two key frames, that is, the two key frames are adjacent key frames. There may also be other key frames between the two key frames.

Reaching the playing point of the MP4 file in a skip way is taken as an example for description. The player positions the first key frame as: a start key frame having the decoding time earlier than the playing point in the MP4 file, and positions the second key frame as: a key frame having the decoding time later than that of the first key frame in the MP4 file. Here, the video frame, corresponding to the playing point, of the media file includes a common frame or a key frame. When the video frame corresponding to the playing point is just the key frame, the start key frame having the decoding time earlier than the playing point in the MP4 file is the key frame corresponding to the playing point. That is, at this time, the first key frame in the media data requested by the player is the key frame corresponding to the playing point.

The operation that the player positions the two key frames in the MP4 file includes that: offsets and capacities of the first key frame and the second key frame are determined according to the identified media information and the current playing point, so as to request the media data between the first key frame and the second key frame from the server based on the offsets and the capacities.

Step 1004: the media data between the two positioned key frames is requested from the server.

In actual implementation, the player transmits a network request to the server to request the media data between the two key frames positioned in the MP4 file. The network request carries the offsets and the capacities of a target range corresponding to the two key frames.

Here, the player positions the video frame in the mdat through the offset and the capacity of the video frame, between the first key frame and the second key frame, in the MP4 file, and positions the audio frame in the mdat through the offset and the capacity of the audio frame aligned with the video frame in the MP4 file. A range composed of upper limits and lower limits of the positions is taken as the target range. The offset and the capacity which correspond to the upper limits of the positions are the offset and the capacity which correspond to the upper limit the target range, and the offset and the capacity which correspond to the lower limits of the positions are the offset and the capacity which correspond to the lower limit the target range.

Step 1005: the player requests the media data between the two key frames in the MP4 file from the server.

1006: the player receives the corresponding media data returned by the server.

1007: the player constructs a fragmented media file of an FMP4 format based on the extracted media data.

In actual implementation, the player calculates metadata of a fragmented media file level according to the media information of the media data, and fills the metadata of the fragmented media file level and the media data according to a packaging format of a fragmented media file of the FMP4 format to obtain the fragmented media file of the FMP4 format.

Step 1008: the player adds different tracks in the fragmented media file into the same source buffer object in the media source object.

The different tracks in the fragmented media file include: (a) a video track and an audio track; and (b) a video track, an audio track and a subtitle track.

Step 1009: the player calls the media element to parse the media source object associated with the virtual address, reads the tracks in the source buffer object of the associated media source object, and decodes and plays the tracks.

The virtual address is used by the media element (a video element+an audio element) to play a video by taking the media source object as a data source.

Based on the above, the embodiment of the disclosure has the following beneficial effects.

1) The fragmented media file converted from the media data in the media file of the non-streaming media format is transmitted to the media element of the webpage through the media source extension interface of the webpage for being decoded and played, so that the media file of the non-streaming media format is played through the webpage, and the restriction that a file of the non-streaming media format may not be independently played until it is completely downloaded is overcome;

2) The media data is converted into the fragmented media file through the player of a front-end webpage, and a background server needs to store media files of different resolutions, and the fragmented media file does not need to be pre-stored on the server side, thereby playing the media file in a way of occupying a small storage space; and 3) The different tracks in the fragmented media file are added to the same source buffer object in the media source object, so that the different tracks are synchronously played, and the defect that sounds and pictures of a media file played through the media source extension interface are asynchronous in the prior art is overcome.

Figure 11:
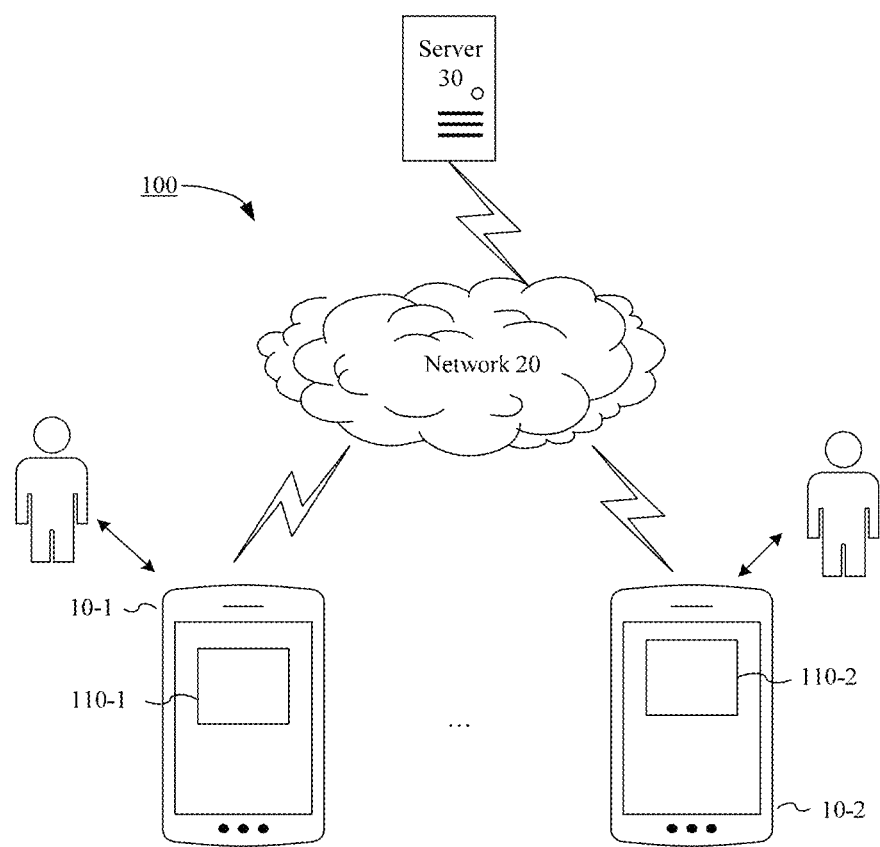
FIG. 11 is a schematic diagram of an optional implementation scene of a synchronously playing method of a media file, provided by an embodiment of the disclosure.

FIG. 11 is a schematic diagram of an optional implementation scene of a synchronously playing method of a media file, provided by an embodiment of the disclosure. Referring to FIG. 11, a synchronously playing device 500 of a media file, provided by the embodiment of the disclosure may be implemented as a user terminal 10. In order to support an exemplary disclosure, the user terminal 10 (exemplarily illustrating a user terminal 10-1 and a user terminal 10-2) is connected with a server 30 through a network 20. The network 20 may be a wide area network or a local area network, or a combination of the wide area network and the local area network, and realizes data transmission by using a wireless link.

The user terminal 10 plays a media file through a webpage with an embedded player, and displays played content through a graphical user interface 110 (exemplarily illustrating a graphical user interface 110-1 and a graphical user interface 110-2). In the play process, the user terminal 10 creates a media source object corresponding to a playing window in the webpage and acquired from a server 30 through the player embedded in the webpage, adds different tracks in a fragmented media file to the same source buffer object in the media source object, transmits a virtual address that takes the media source object as a data source to a media element of the webpage, calls the media element to parse the media source object associated with the virtual address, and reads the tracks in the source buffer object of the associated media source object and decodes and plays the tracks.

The above is only the preferred embodiments of the disclosure, and is not intended to limit the protection scope of the disclosure. Any modifications, equivalent replacements, improvements and the like that are made within the spirit and principle of the disclosure shall fall within the protection scope of the disclosure.

The invention claimed is:

1. A synchronously playing method of a media file, comprising:
    creating a media source object corresponding to a playing window in a webpage by a player embedded in the webpage;
    adding different tracks in a fragmented media file into an identical source buffer object in the media source object;
    transmitting a virtual address taking the media source object as a data source to a media element of the webpage;
    calling the media element to parse the media source object associated with the virtual address; and
    reading tracks in the source buffer object of the associated media source object, and decoding and playing the tracks.

2. The method according to claim 1, wherein the adding different tracks in a fragmented media file into an identical source buffer object in the media source object comprises:
    extracting a video track from the fragmented media file and an audio track synchronized with the video track; and
    adding the extracted video track and audio track to the identical source buffer object in the media source object;
    wherein the source buffer object is created corresponding to the playing window that receives a playing event in the webpage.

3. The method according to claim 2, wherein the method further comprises:
    when the media file includes a subtitle track, adding the subtitle track synchronized with the extracted video track to the identical source buffer object.

4. The method according to claim 3, wherein the reading tracks in the source buffer object of the associated media source object, and decoding and playing the tracks comprises:
    calling a video element of the webpage to decode and play the video track and the subtitle track which are added into the source buffer object; and
    synchronously calling an audio element of the webpage to decode and play the audio track added into the source buffer object.

5. The method according to claim 1, wherein the method further comprises:
    when the media file adopts a non-streaming package format,
    acquiring media data corresponding to a given period in the media file in response to the playing event corresponding to the media file in the webpage; and
    creating the fragmented media file for independently decoding based on the acquired media data.

6. The method according to claim 1, wherein the method further comprises:
    acquiring a fragmented media file with target resolution;
    clearing away a fragmented media file with original resolution, which is added into the source buffer object and is not decoded and played; and
    adding the fragmented media file with target resolution to the identical source buffer object in the media source object, so as to continue to play the fragmented media file with target resolution from the playing point where the fragmented media file with original resolution is over.

7. The method according to claim 2, wherein the method further comprises:
    acquiring a fragmented media file with target resolution;
    clearing away a fragmented media file with original resolution, which is added into the source buffer object and is not decoded and played; and
    adding the fragmented media file with target resolution to the identical source buffer object in the media source object, so as to continue to play the fragmented media file with target resolution from the playing point where the fragmented media file with original resolution is over.

8. The method according to claim 3, wherein the method further comprises:
    acquiring a fragmented media file with target resolution;
    clearing away a fragmented media file with original resolution, which is added into the source buffer object and is not decoded and played; and
    adding the fragmented media file with target resolution to the identical source buffer object in the media source object, so as to continue to play the fragmented media file with target resolution from the playing point where the fragmented media file with original resolution is over.

9. The method according to claim 4, wherein the method further comprises:
    acquiring a fragmented media file with target resolution;
    clearing away a fragmented media file with original resolution, which is added into the source buffer object and is not decoded and played; and
    adding the fragmented media file with target resolution to the identical source buffer object in the media source object, so as to continue to play the fragmented media file with target resolution from the playing point where the fragmented media file with original resolution is over.

10. The method according to claim 5, wherein the method further comprises:
    acquiring a fragmented media file with target resolution;
    clearing away a fragmented media file with original resolution, which is added into the source buffer object and is not decoded and played; and adding the fragmented media file with target resolution to the identical source buffer object in the media source object, so as to continue to play the fragmented media file with target resolution from the playing point where the fragmented media file with original resolution is over.

11. The method according to claim 6, wherein the acquiring a fragmented media file with target resolution comprises:
acquiring the fragmented media file with target resolution according to an update of network parameters of the player for adapting the update of the network parameters; or
in response to receiving a resolution switching event in the playing window, correspondingly acquiring the fragmented media file with target resolution according to target resolution indicated by the resolution switching event.

12. The method according to claim 7, wherein the acquiring a fragmented media file with target resolution comprises:
acquiring the fragmented media file with target resolution according to an update of network parameters of the player for adapting the update of the network parameters; or
in response to receiving a resolution switching event in the playing window, correspondingly acquiring the fragmented media file with target resolution according to target resolution indicated by the resolution switching event.

13. A synchronously playing device of a media file, wherein the device comprises:
at least one processor; and
at least one memory communicatively coupled to the at least one processor and storing instructions that upon execution by the at least one processor cause the device to:
create a media source object corresponding to a playing window in a webpage by a player embedded in the webpage;
wherein the media resource creation module is configured for adding different tracks in a fragmented media file into an identical source buffer object in the media source object;
transmit a virtual address taking the media source object as a data source to a media element of the webpage;
call the media element to parse the media source object associated with the virtual address;
wherein the media resource play module is configured to read tracks in the source buffer object of the associated media source object, and decode and play the tracks.

14. The device according to claim 13, wherein the at least one memory further stores instructions that upon execution by the at least one processor cause the device system to:
extract a video track from the fragmented media file and an audio track synchronized with the video track;
add the extracted video track and audio track to the identical source buffer object in the media source object;
wherein the source buffer object is created corresponding to the playing window that receives a playing event in the webpage.

15. The device according to claim 14, wherein the at least one memory further stores instructions that upon execution by the at least one processor cause the device system to add a subtitle track synchronized with the extracted video track to the identical source buffer object.

16. The device according to claim 14, wherein the at least one memory further stores instructions that upon execution by the at least one processor cause the device system to:
call a video element of the webpage to decode and play the video track and the subtitle track which are added into the source buffer object;
synchronously call an audio element of the webpage to decode and play the audio track added into the source buffer object.

17. The device according to claim 13, wherein the at least one memory further stores instructions that upon execution by the at least one processor cause the device system to:
acquire media data corresponding to a given period in the media file in response to the playing event corresponding to the media file in the webpage;
create the fragmented media file for independently decoding based on the acquired media data.

18. The device according to claim 13, wherein the at least one memory further stores instructions that upon execution by the at least one processor cause the device system to:
acquire a fragmented media file with target resolution;
clear away a fragmented media file with original resolution, which is added into the source buffer object and is not decoded and played; and
add the fragmented media file with target resolution to the identical source buffer object in the media source object, so as to continue to play the fragmented media file with target resolution from the playing point where the fragmented media file with original resolution is over.

19. The device according to claim 18, wherein the at least one memory further stores instructions that upon execution by the at least one processor cause the device system to:
acquire the fragmented media file with target resolution according to an update of network parameters of the player for adapting the update of the network parameters;
in response to receiving a resolution switching event in the playing window, correspondingly acquire the fragmented media file with target resolution according to target resolution indicated by the resolution switching event.

20. A non-transitory computer readable storage medium, storing computer-readable instructions that upon execution by a processor cause the processor to perform operations comprising:
creating a media source object corresponding to a playing window in a webpage by a player embedded in the webpage;
adding different tracks in a fragmented media file into an identical source buffer object in the media source object;
transmitting a virtual address taking the media source object as a data source to a media element of the webpage;
calling the media element to parse the media source object associated with the virtual address; and
reading tracks in the source buffer object of the associated media source object, and decoding and playing the tracks.

* * * * *